United States Patent
Norsk et al.

(10) Patent No.: US 8,377,386 B2
(45) Date of Patent: Feb. 19, 2013

(54) CATALYTIC REACTOR

(75) Inventors: Jesper Norsk, Humlebæk (DK); Esben Lauge Sørensen, Hillerød (DK); Niklas Jakobsson, Kägeröd (SE)

(73) Assignee: Haldor Topsoe A/S, Lyngby (DK)

( * ) Notice: Subject to any disclaimer, the term of this patent is extended or adjusted under 35 U.S.C. 154(b) by 153 days.

(21) Appl. No.: 12/919,796

(22) PCT Filed: Mar. 5, 2009

(86) PCT No.: PCT/EP2009/001543
§ 371 (c)(1),
(2), (4) Date: Aug. 27, 2010

(87) PCT Pub. No.: WO2009/109379
PCT Pub. Date: Sep. 11, 2009

(65) Prior Publication Data
US 2011/0014109 A1  Jan. 20, 2011

(30) Foreign Application Priority Data

Mar. 7, 2008 (DK) .................................. 2008 00344

(51) Int. Cl.
*B01J 19/00* (2006.01)
*B01J 8/06* (2006.01)
*C10G 35/04* (2006.01)

(52) U.S. Cl. ........ 422/220; 422/224; 422/312; 366/337; 366/338; 366/340; 208/63; 208/66; 208/134

(58) Field of Classification Search ................. 422/220, 422/312, 224; 366/337, 338, 340; 208/63, 208/66, 134
See application file for complete search history.

(56) References Cited

U.S. PATENT DOCUMENTS

| | | | |
|---|---|---|---|
| 4,019,719 A * | 4/1977 | Schuster et al. ............. | 366/338 |
| 4,859,642 A | 8/1989 | Hoelderich et al. | |
| 2001/0003291 A1 | 6/2001 | Uematsu et al. | |

FOREIGN PATENT DOCUMENTS

| DE | 37 38 473 A1 | 6/1988 |
|---|---|---|
| JP | 09060764 A | 3/1997 |

* cited by examiner

*Primary Examiner* — Walter D Griffin
*Assistant Examiner* — Lessanework Seifu
(74) *Attorney, Agent, or Firm* — Dickstein Shapiro LLP

(57) ABSTRACT

Flow deflector that is capable of changing the flow direction of a fluid during passage through a duct. The duct is formed by an inner and outer duct, which creates an annular region in the duct. The flow deflector forces the fluid passing through the annular region of the duct to flow inside the inner duct, while the fluid passing through the inner duct is forced to flow through the annular region. Reactor tubes for catalytic reactors are formed by assembling tubes comprising said flow deflector and having a catalyst arranged in the inner tube.

11 Claims, 3 Drawing Sheets

CATALYTIC REACTOR

The present invention relates to a flow deflector that is capable of changing the flow direction of a fluid during passage through a duct, such as a tube. The duct can be formed by an inner and outer duct, which creates an annular region in the duct. The flow deflector forces the fluid passing through the annular region of the duct to flow inside the inner duct, while the fluid passing through the inner duct is forced to flow through the annular region or vice versa. The invention relates particularly to circular ducts such as tubes comprising said flow deflector and having a catalyst arranged in the inner tube. The tubes may be assembled into elongated tubes to form reactor tubes for use in catalytic reactors such as tubular reformers for steam reforming.

Conventional steam reforming technology uses reforming catalyst in the form of particles of various sizes and shapes. The particles are placed in reformer tubes to form a catalyst fixed bed. Since the reforming reaction is endothermic the heat required in the reaction is supplied from the environment outside the tubes usually by combining radiation and convection heat on the outer side of the reformer tube. In tubular reformers (radiant furnaces), the external heat supplied to the reformer tubes is predominantly radiation heat from flames generated by burners arranged along the walls of the tubular reformer. The heat is transferred to the inner side of the reformer tubes by heat conduction through the tube wall then to the gas phase by convection and subsequently to the catalyst particles also by convection. To enhance heat transfer the use of a catalyst system where a layer of catalyst is fixed on a surface of another material, e.g. metallic surfaces, has also been proposed for instance as described in our U.S. Pat. Nos. 6,746,624, 6,319,877 and U.S. Pat. No. 6,576,158 as "catalysed hardware". Such metallic surface serves as the supporting structure giving strength to the catalyst system. The heat transport to the catalyst occurs by conduction from the inner tube wall, which represents a much more efficient transport mechanism than the transport by convection via the gas phase.

The concept of supporting or fixing the catalyst on a surface of another material such as in the wall of the reformer tube has been demonstrated to give a compact tubular reformer with superior heat transfer, freedom to use low steam-to-carbon ratios when using noble metal catalysts, low pressure drop and high heat flux. However, there is a downside when it comes to the ability to exchange catalyst, since it is also required to replace the tubes, which is seen as a deterrent for the use of this catalyst technology in its present form and state.

The use of solid structural elements in the form of monoliths, e.g. honeycombs for carrying out catalytic endothermic or exothermic reactions has also been suggested. Our U.S. Pat. No. 4,985,230 describes for instance the use of a catalyst in the form of a structural element having a number of channels. Upon passage through the channels the process fluid is subdivided in sub-streams flowing at an angle with respect to the length direction of the overall fluid flow. When reaching one of the walls enclosing the catalyst, the flow direction of the sub-streams is changed.

In U.S. Pat. No. 4,859,642 structural elements in the form of individually spaced honeycomb catalyst elements and inert static mixing elements placed in between said individual honeycomb elements are used to form a fixed bed catalytic reactor tube. Gas entering at the centre of the mixing element is directed towards the sides of the downstream honeycomb catalyst, and gas entering at the sides of the mixing element is directed to the centre of the downstream honeycomb catalyst. Thus, the overall flow direction is maintained and there is no annulus region in the reactor tube. The catalyst-free regions occupied by the static mixer represent about 50% of the length of the tube segment. Apart from significant pressure drops through the static mixing elements, this concept results often in the formation of inexpedient "hot bands" when carrying out endothermic processes such as reforming since higher hydrocarbons may reach high temperatures as a result of the heat exchanging zone (static mixing element) being disposed in series with the honeycomb catalyst, while heat is provided throughout the entire tube length. "Hot bands" occur normally in tubular reformers as a result of hydrocarbons reaching high temperatures because of reduced catalyst activity in some regions of the reformer tubes.

It is an object of the present invention to be able to design a tubular reformer that has a performance close to that where a layer of catalyst is fixed on a surface of another material, but where the catalyst can be exchanged without replacing the tubes.

It is another object of the invention to provide a tubular reformer with at least the same performance as conventional tubular reformers, but which is less costly.

It is a further object of the invention to provide a superior reactor tube built from structural elements with lower pressure drop and less risk of forming hot bands in a tubular reformer.

These and other objects are solved by the present invention.

In a first aspect of the invention, we provide a flow deflector that is able to turn the flow of fluids in a duct or channel.

In its broadest form we provide a flow deflector comprising a first member and second member, in which either of said first and second member has a geometry selected from concave, convex, planar, piano-concave, piano-convex and combinations thereof, and in which said first and second members intersect and form an angle $\alpha$ of 30° to 150° with respect to each other, the first member is provided with an aperture that defines an inner perimeter on said first member, said inner perimeter of the first member corresponds to the perimeter of the second member, and said second member intersects said first member through the aperture and at intersection points on the first member located along a line joining two directly opposing points of the inner perimeter of the first member.

As used herein the term concave member means a member having a surface which is curved inwards, the term convex means the opposite of concave, the term planar means a flat surface, the term plano-concave member means a member which is flat on one side and concave on the other, and the term piano-convex member means a member which is flat on one side and convex on the other. Combinations thereof include biconcave, biconvex and convex-concave geometries. After providing the aperture in the first member other geometries may arise; for instance, a biconvex first member which is provided with an aperture (hole) at its centre results in ring-shaped member having torus geometry. The ratio of the perimeter of the member with respect to its thickness is at least 2, preferably at least 10 or at least 100. A ratio as low as 2 applies mostly to piano-concave or piano-convex members, while a ratio of at least 10 defines members having a thin surface with any of the above geometries although more preferably to members with concave, convex or planar geometry.

It would be understood that the geometries of the members of the flow deflector may not need to be the same. For instance, the first member may be planar, while the second member may be concave or the opposite.

Preferably, the aperture of the first member is concentric with the rest of the first member.

In a preferred embodiment of the invention, the first and second members are planar; the first planar member extends along a first plane and the second planar member extends along a second plane. Hence, we provide a flow deflector in the form of a first planar member, which extends along a first plane and a second planar member, which extends along a second plane and wherein said first and second planar members intersect and form an angle α of 30° to 150° with respect to each other, the first planar member is provided with an aperture that defines an inner perimeter on said first planar member, said inner perimeter of the first planar member corresponds to the perimeter of the second planar member, and said second planar member intersects said first planar member through the aperture and at intersection points on the first planar member located along a line joining two directly opposing points of the inner perimeter of the first planar member.

The aperture of the first planar member is preferably concentric with the rest of the first planar member.

In the preferred embodiment the flow deflector may thus be seen as plate (first planar member) having an aperture in the middle, which is traversed by a smaller plate (second planer member) whose perimeter is equal to that of the aperture. The aperture is traversed by the smaller plate in such a way that both plates form an angle (α) with respect to each other. The flow deflector is preferably symmetrical with respect to a line joining the two directly opposing points of the inner perimeter of the first planar member; hence, the line divides the first planar member into two substantially equal halves.

The flow deflector can be easily produced by simply cutting out a section in the middle of the first planar member, thus creating the aperture and simultaneously forming the second planar member from the aperture section being excised from the first planar. The formed second planar member is then flipped in order to form said angle (α).

Since the first member is larger, i.e. has a greater perimeter than the second member, the flow deflector of the invention may advantageously be adapted to a duct, where it is necessary to change the travelling direction of the flow from a region close to the duct wall towards a region at the centre of the duct, or vice versa, particularly in heat exchanging operations.

The invention encompasses therefore also a duct having said flow deflector arranged therein. In one embodiment the duct is formed by an inner and outer duct in which the space inside the inner duct defines a inner region for the passage of a fluid and the space between the inner and outer duct defines an annular region for the passage of the fluid, the first member intersects said annular region and extends across said annular region at an angle α/2 with respect to the length axis of the duct until contacting the outer duct along the perimeter of the first member, the second member intersects said inner region and extends across said inner region until contacting the inner duct along the perimeter of said second member.

In another embodiment, for instance in the case of cooled reactors, in particular boiling water reactors, only a single (outer) duct is provided. The flow deflector is placed inside the duct and in the region near above and below the flow deflector an inner duct piece is provided to allow the fluid stream to be distributed along the perimeter of the (outer) duct. The inner duct can have any length from zero and up to the maximum length provided by the duct. Preferably however the inner duct is not longer than necessary to ensure division of a central flow steam from a peripheral flow stream in the duct. This embodiment can comprise a perforated plate or a mesh on both ends of the inner duct piece to prevent catalytic particles to enter the flow deflector region. An example of a boiling water reactor is a boiling water reactor for production of methanol.

As used herein, the term "fluid" defines a gas, such as supercritical or subcritical gas, liquid or combinations thereof.

Hence, the perimeter region of the first member is adapted to fit the wall of the outer duct, while the perimeter region of the second member is adapted to fit the wall of the inner duct. In other words, the first member and outer duct are fitted along the perimeter line of the first member, while the second member and inner duct are fitted along the perimeter line of the second member. Since the first member intersects the annular region of the duct and extends across said annular region at an angle α/2 with respect to the length axis of the duct until contacting the outer duct along the perimeter of the first member, the direction of the fluid in the annular region is deflected and the fluid is forced to pass through the inner region of the duct. Similarly, since the second member intersects the inner region of the duct and extends across said inner region until contacting the inner duct along the perimeter of said second member, the direction of the fluid in the inner region is simultaneously deflected, and the fluid is forced to pass through the annular region of the duct.

In a preferred embodiment of the duct containing the flow deflector, the first and second members are planar. Accordingly, the invention encompasses also a duct having a flow deflector arranged therein, wherein the first and second members are planar with the first planar member extending along a first plane and the second planar member extending along a second plane, the duct is formed by an inner and outer duct in which the space inside the inner duct defines a inner region for the passage of a fluid and the space between the inner and outer duct defines an annular region for the passage of the fluid, the first planar member intersects said annular region and extends across said annular region at an angle α/2 with respect to the length axis of the duct until contacting the outer duct along the perimeter of the first planar member, the second planar member intersects said inner region and extends across said inner region until contacting the inner duct along the perimeter of said second planer member.

The angle α defining the relative position of the first and second members of the flow deflector is in the range 30° to 150°, preferably 60° to 120°, more preferably 80° to 100°, most preferably about 90°. In order to make the angle α independent of the geometry of the first and second members, the angle is measured from the perimeter of the second member to the outer perimeter of the first member, i.e. from edge of second member to outer edge of first member. Since the angle of the first member, which is preferably a planar member with respect to the length axis of the duct is α/2 (the length axis bisects α) the first member is tilted with respect to the length axis of the duct, and so is the second member, which preferably also is a planar member.

The duct can in principle have any shape, but is preferably a square duct, rectangular duct, circular duct such as a pipe or tube.

A combination of ducts shapes is also possible. Thus, the outer duct can be square or rectangular while the inner duct is round, for instance a pipe running inside a square or rectangular duct.

More preferably, the duct is a tube in which the inner duct is in the form of an inner tube and the outer duct is in the form of an outer tube, the inner tube further comprises a catalyst selected from particles forming a catalyst fixed bed, catalyst coated or impregnated on structural elements arranged within the inner tube and combinations thereof. This allows combining high heat transfer rate in an annulus with a catalyst segment in the centre of the tube that can provide gas conversion at lower linear velocity. The gas is forced to alter position between annulus and centre using the flow deflector.

Hence, contrary to prior art systems such as that of U.S. Pat. No. 4,859,642 in which a static mixer forming the heat exchanging zone is arranged in series and thereby sequentially with the structural element (honeycomb catalyst), the present invention provides the heat exchanging zone (annulus) around the structural element. The flow in the tube changes position from annulus to inner tube simultaneously and as a result, the propensity to form "hot bands" in endothermic reactors such as tubular reformers are significantly reduced.

As used herein the term "structural element" defines devices comprising a plurality of layers with flow channels in between the adjoining layers that form flow channels which cross each other or form straight channels. The term "structural element" defines also elements having a high surface area such as pall-rings, saddle rings and Raschig rings.

Although it is possible to operate with catalyst particles forming a fixed bed in the inner tube, it is preferred that the catalyst is coated or impregnated on structural elements arranged within the inner tube. Preferably, the structural element is in the form of a monolith, such as a straight-channel monolith or cross-corrugated monolith, more preferably a straight-channel monolith in order to reduce the pressure drop in the tube.

The use of a monolith in the centre of the tube enables a low pressure drop over the centre of the tube segment. The reformer must preferably run at high mass flux to achieve good heat transfer in the annulus and as half of the flow runs in the centre a conventional fixed catalyst bed would give a higher pressure drop and unfeasible proportions between annulus width and reformer tube diameter compared to using monoliths coated or impregnated with catalyst. The use of monoliths enables the reduction of tube wall thickness and accordingly the benefits from a higher heat transfer coefficient on the inner region of the reactor tube may be fully exploited. In addition, the tube diameter in a tubular reformer will not be limited by the relation between catalyst particle diameter and the inner diameter of the reforming tube, whereas in a conventional tubular reformer with a fixed bed of reforming catalyst smaller tubes must be loaded with smaller catalyst particles, which leads to higher pressure drop.

The invention results also in the construction of a more compact and thereby less costly reformer compared to state-of-the-art tubular reformers, since it is now possible to use reforming tubes of a smaller diameter and thus with a thinner wall thickness and a higher heat flux. Using a coated catalyst enables the use of noble metal catalysts and operation at low steam to carbon ratios, which also reduce plant equipment size. Compared to the so-called catalysed hardware concept where a layer of catalyst is fixed on a surface of another material, one of the advantages now is that the catalyst can be exchanged without changing reactor tubes. The invention offers also the advantage that more catalyst may be provided within the reformer compared to the catalysed hardware concept.

In one particular embodiment of the invention, the catalyst, which is preferably a reforming catalyst, is coated or impregnated on the outside of the monolith wrapping in contact with the inner tube. The presence of catalyst on the monolith wrapping, i.e. on the inner wall of the annulus channel, enables the lowering of the temperature of the gas due to the endothermic reforming reaction which provides a larger temperature difference between the inner wall of tube and the gas and therefore increases the heat flux into the tube. Accordingly, some reforming activity is brought to the annulus and consequently it is possible to lower the tube wall temperature.

In order to further enhance heat transfer, the annular region of the tube may be provided with static mixing elements that promote turbulence in the flow, yet without significantly increasing the pressure drop. Accordingly, in a further embodiment of the invention the annular region of the tube is provided with static mixing elements selected from the group consisting of corrugated surface fitted along the outer wall of the inner tube, corrugated surface fitted along the inner wall of outer tube, spiral element extending along the width and length of the tube and combinations thereof. The corrugated surface is preferably in the form of a pleated ceramic or metal foil or the like which can be adapted to the tube walls.

The invention enables the construction of reactor tubes from tube segments with each tube segment containing a structural element, annulus and flow deflector. A tube segment is normally about 0.5 m long with the flow deflector representing 5 to 30% of the length of the tube segment, preferably about 20% which corresponds to 0.1 m out of a 0.5 m tube segment. The tubes are then assembled into elongated tubes in the form of reactor tubes 9-15 m long or other suitable length for use in catalytic reactors such as tubular reformers for steam reforming. Accordingly, the invention provides also a reactor tube comprising a number of tubes as defined above stacked on top of each other.

The thus formed reactor tubes are then used as reactor internals in catalytic reactors. In a preferred embodiment, we provide a reactor comprising one or more reactor tubes as defined above in which the reactor is an endothermic catalytic reactor, preferably a tubular reformer.

In another aspect of the invention, we provide a process for reforming hydrocarbons by means of the reactor tubes of the invention. Accordingly, we provide a process for reforming a hydrocarbon feed in a reactor according to claim 11, the method comprising:

(a) passing said hydrocarbon feed to at least one reactor tube,
(b) dividing said hydrocarbon feed into a sub-stream passing through the annular region and a sub-stream passing through the inner tube of the reactor tube,
(c) subjecting the sub-stream passing through the inner tube to reforming by passage through the catalyst fixed bed and/or the one or more structural elements arranged within the inner tube,
(d) deflecting the sub-stream leaving the catalyst fixed bed and/or the one or more structural elements towards the annular region and simultaneously deflecting the sub-stream passing through the annular region towards the inner tube,
(e) conducting steps (c) and (d) at least once, and
(e) withdrawing from the reactor a reformed hydrocarbon stream.

The sub-stream running through the annulus is heated from an external source, while the sub-stream running through the inner tube is cooled via the endothermic reforming taken place on e.g. the catalytic structural elements arranged therein. After having passed one or more structural elements, the sub-stream leaving the structural elements is deflected towards the annulus, and at the same time the sub-stream running through the annulus region is deflected towards the inner tube. Hence, the cooled partly reformed sub-stream is heated while the heated sub-stream in the annulus is ready for reforming in the inner tube. The invention provides therefore efficient heat transfer from the external source, e.g. reformer wall, to the process gas (hydrocarbon stream).

Figure 1:
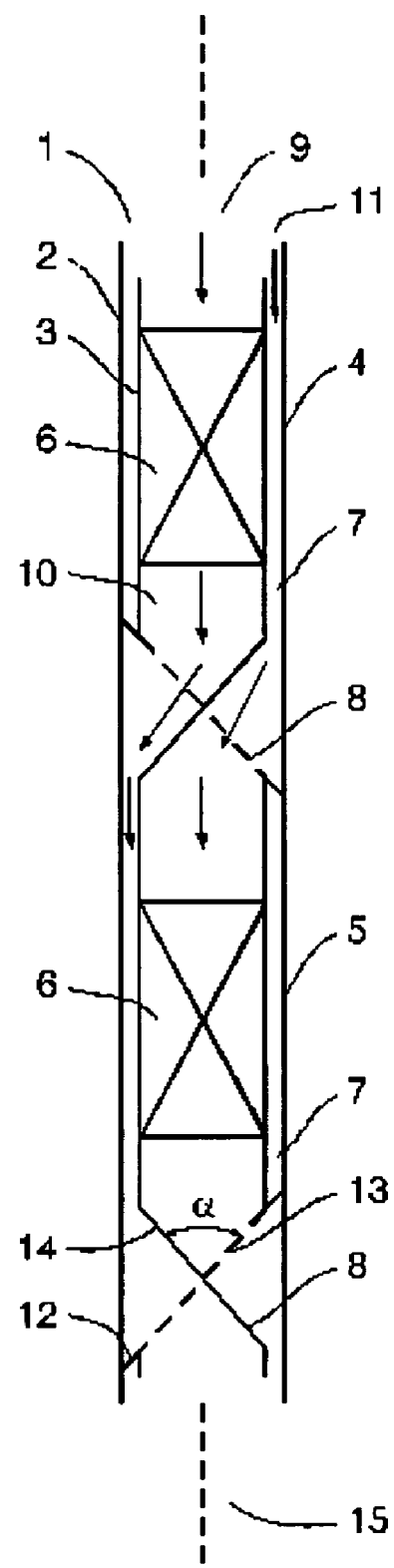
FIG. 1 is a schematic view of a section of a reactor tube unifying two tube segments with monoliths in the inner region, heat exchange in the annulus region and a flow deflector in between segments.

By the invention it is possible to build the reactor internal as segments. In FIG. 1 a section of reactor tube 1 containing an outer tube 2 and inner tube 3 is depicted in which individual tube segment 4 is merged with individual tube segment 5. Each tube segment contains a straight channel monolith 6, an annulus 7 and a flow deflector 8. The flow 9 entering the reactor tube 1 is divided into two sub-streams: one sub-stream 10 running through the monolith 6 and thus being subjected to endothermic catalytic reforming and the other sub-stream 11 running outside the monolith 6 in an annulus 7 receiving heat from the wall of a tubular reformer. At the outlet of each segment the flow deflector 8 redirects the flow so that the heated gas that travels in the annulus 7 will travel through the monolith 6 in the inner tube 3 in the next section and vice versa. The flow deflector 8 contains a first planar member 12 with aperture 13 and second planar member 14. The first and second planar members intersect and form an angle α with respect to each other, which is here 90°. The first planar member 12 intersects the annulus 7 and extends across said annulus at an angle of α/2 with respect to the length axis 15 of the reactor tube 1 until contacting the outer tube 2 along the perimeter of the first planar member 12. Thereby, the flow in the annulus 7 is blocked and forced to take a path towards the inner tube 3. The second planar member 14 intersects the inner region created by the inner tube 3 and extends across said inner region until contacting the inner tube 3 along the perimeter of said second planer member 14. Thereby, the flow inside the inner tube 3 is blocked and forced to take a path towards the annulus 7. As there is an equal number of catalyst and annulus passes, symmetry will assure a 50/50 split of the feed flow at the inlet.

Figure 2:
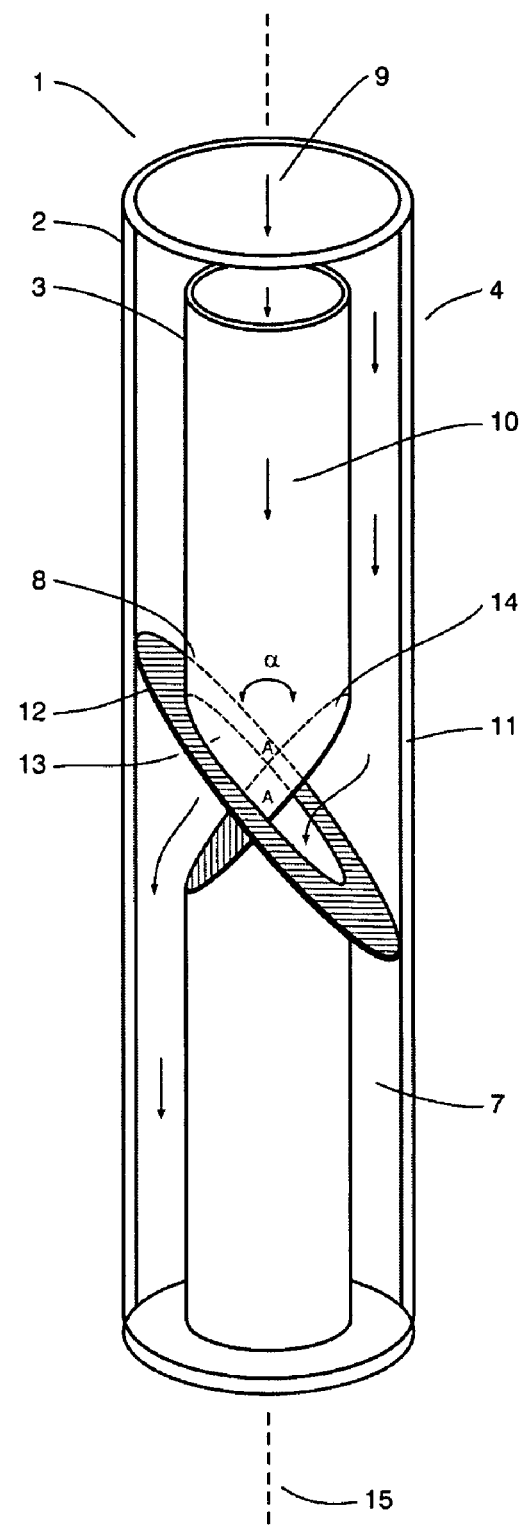
FIG. 2 is a perspective view of a section of the reactor tube of FIG. 1.

FIG. 2 is a perspective view of section 4 of the reactor tube of FIG. 1 showing details of the flow deflector. The same reference numerals are used in both figures. In this embodiment the aperture 13 is concentric with the rest of the first planar member 12. The first planar member may thus be seen as a ring, whereas the second planar member 14 is solid (without apertures). Accordingly, the flow is simultaneously transferred from annulus to inner tube and from inner tube to annulus as it travels through the reaction tube. It is seen that the second planar member 14 intersects said first planar member 12 through the aperture 13 and at intersection points "A" on the first planar member located along a line A-A joining two directly opposing points of the inner perimeter of the first planar member. The line A-A joining intersection points "A" divides the first plane member 12 into two substantially equal halves so that the flow deflector 8 becomes symmetrical. This line A-A is intersected at its midpoint by the line defining the length axis 15 of the tube 1. The inner perimeter of the first planar member 12, which is given by the aperture 13, corresponds to the perimeter of the second planar member 14. The first planar member 12 extends until contacting the wall of the outer tube 2, while the second planar member extends until contacting the wall of the inner tube 3. Hence the perimeter region of the first planar member is adapted to fit the wall of the outer tube, while the perimeter region of the second planar member is adapted to fit the wall of the inner tube. In other words, the first planar member and outer tube are fitted along the perimeter line of the first planar member, while the second planar member and inner tube are fitted along the perimeter line of the second planar member.

The reforming tube (reactor tube) is designed to receive heat from a tubular reformer chamber in a conventional manner through burners or alternatively by catalytic combustion on the outer side of the reactor tube. The heat is efficiently transferred to the gas inside the reformer reactor tube through the annulus, where a high linear velocity gives a high heat transfer coefficient. A straight channel monolith in the centre has poor heat transfer characteristics and operates at near adiabatic conditions. The gas is thus heated in the annulus and cooled by the reforming reaction in the monolith.

Figure 3:
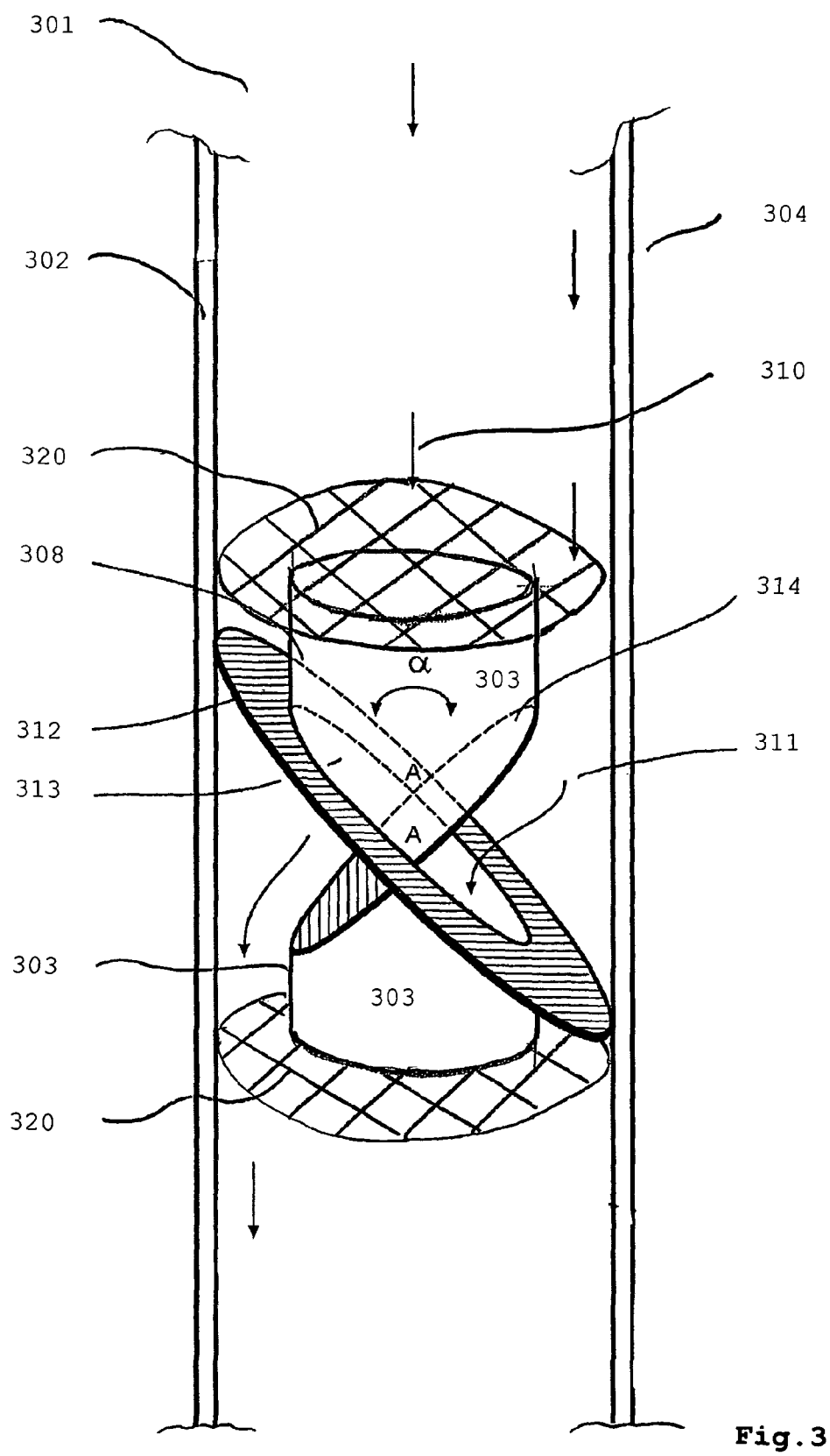
FIG. 3 is a perspective view of a flow deflector comprising inner tube pieces and mesh end pieces in a single reactor tube.

FIG. 3 shows an embodiment where a flow deflector 308 is provided in a single reactor tube 301/302. Such single tubes are often used in cooled reactors. The cooled reactors comprise reactor tubes filled with catalytic particles, so called "Catit" or reactors comprising tubes with catalytic particles inside the reactor but outside and surrounding the tubes, so called "Catot". FIG. 3 shows and embodiment of a Catit-reactor, where the catalytic particles are inside the reactor tubes. An exothermic reaction takes place in the reactor tubes and to control the temperature the reaction is cooled by a fluid (for instance water) in contact with the outer surface of the reactor tube. In this embodiment, the reactor tube 301 consists of only an outer tube 302, hence there is no annular with a wall separating the first sub stream 310 from the second sub stream 311.

Still, in such reactors where an exothermic catalytic reaction takes place there is a temperature gradient from the central part of the cross section of the reactor tube to the cooled periphery of the tube, even though there is no inner tube wall separating these two zones, in reality there will be a first central sub stream of higher temperature than the peripheral sub stream. Hence it is in many cases advantageous to supply also these reactor tube types with flow deflectors 308. The flow deflector does in this embodiment work analogue to the deflector according to FIG. 2. However, in this embodiment in a short region axially before and after the flow deflector, a short inner tube piece 303 is optionally provided to locally separate the first sub stream 310 from the second sub stream 311 and thus to enable the inner sub stream that is deflected to the periphery zone to be evenly distributed in this new zone, and conversely to enable the periphery second sub stream 311 that is deflected to the central zone to be evenly distributed there. The length of the inner tube can vary from zero to maximally the length of the reactor. Often it is advantageous to provide a length of the inner tube which is just enough to ensure division of the two sub streams. Optionally a permeable barrier 320 such as a wire mesh, a perforated plate or the like can be provided at each end of the flow deflector if no catalytic particles are desired in the flow deflector zone. In a Catot-reactor, the flow deflector can be provided in the catalytic material in zones experiencing undesirable temperature differences along a direction approximately perpendicular to the flow direction.

EXAMPLE 1

Monoliths coated with noble-metal catalyst and Ni-based catalyst have been extensively investigated. The present concept has been thoroughly evaluated in connection with a revamp of the primary reformer (tubular reformer) of a 2050 MTPD ammonia plant. In the study a 13 m reformer tube was filled with 14 tube segments and it was found that about 20% increase of capacity was possible with maintained conversion and tube temperature and pressure drop. The revamp study was chosen in order to provide a concrete case for comparison with conventional tubular reformer technology. Much larger advantages are obtained with a dedicated reformer design with smaller tubes.

EXAMPLE 2

The advantages of using a tubular reformer according to the invention are shown in the following where a conventional tubular reformer containing fixed bed catalyst and operating as a primary reformer under conditions suitable for the production of ammonia synthesis gas is compared to a tubular reformer according to the invention operating under the same conditions.

It is shown that for a given industrial tubular reformer the amount of tube material can be reduced by a factor of 3. The high heat transfer rate of the reactor according to the present invention enables a high productivity per volume reactor and per external area of reactor.

To make a proper comparison between a conventional tubular reformer and a tubular reformer according to the invention, the two cases are normalized by using identical inlet conditions (except for throughput), rector length, temperature profile on the outer wall and identical kinetic expressions on the catalyst performance. The tubular reformer of the invention is designed to provide an identical product gas compared to a conventional tubular reformer, but in a more compact reactor. The inlet and outlet conditions are given in greater detail in Table 1.

TABLE 1

Inlet and outlet conditions

| Operating conditions | Conventional tubular reformer | Tubular reformer of invention |
|---|---|---|
| Inlet conditions | | |
| Inlet flow rate/tube (kmol/h) | 43.8 | 24.7 |
| Pressure (kg/cm$^2$ g) | 42.2 | 42 |
| Temperature (° C.) | 526 | 526 |
| Gas composition | | |
| Hydrogen (%) | 0.47 | 0.47 |
| water (%) | 75.8 | 75.8 |
| Nitrogen (%) | 0.36 | 0.36 |
| Carbon monoxide (%) | 0 | 0 |
| Carbon dioxide (%) | 0.24 | 0.24 |
| Argon (%) | 0.0019 | 0.0019 |
| Methane (%) | 22.45 | 22.45 |
| Ethane (%) | 0.53 | 0.53 |
| Propane (%) | 0.11 | 0.11 |
| Outlet conditions | | |
| Pressure (kg/cm$^2$ g) | 39.4 | 39.6 |
| Temperature (° C.) | 798 | 819 |
| Reforming equilibrium outlet temperature (° C.) | 792 | 795 |
| Gas composition | | |
| Hydrogen (%) | 38.74 | 38.78 |
| Water (%) | 42.2 | 42.2 |
| Nitrogen (%) | 0.28 | 0.28 |
| Carbonmonoxide (%) | 5.2 | 5.2 |
| carbondioxide (%) | 6 | 6 |
| Argon (%) | 0.0015 | 0.0013 |
| Methane (%) | 7.54 | 7.51 |
| Ethane (%) | 0 | 0 |
| Propane (%) | 0 | 0 |

As seen from Table 1 the inlet and outlet conditions are close to be identical apart from the lower pressure drop in the tubular reformer of the invention. The equilibrium temperature out of the tubular reformers is essentially the same, whereas the outlet temperature from the tubular reformer of the invention is higher indicating that the approach to equilibrium for the endothermic reforming reaction is somewhat higher.

One of the major advantages using a tubular reformer according to the present invention is that it enables a smaller tube diameter without excessive pressure drop. A smaller tube diameter implies less stress on the material at a given pressure and thus enables the use of thinner tube walls. The reactor length is kept constant. Details regarding mechanical design and internals are given in Table 2.

TABLE 2

Mechanical design and reactor internals

| Mechanical design and internals | Conventional tubular reformer | Tubular reformer of invention |
|---|---|---|
| Reactor length (m) | 13 | 13 |
| Tube diameter (mm, outer) | 152 | 59 |
| Tube diameter (mm, inner) | 125.6 | 46.8 |
| Pellet size R-67-7H nickel catalyst (OD, mm × H, mm) (Holes × D, mm) | 16*11 7 × 3.4 | — |
| Number of segments (0.5 m in length) | — | 26 |
| Monolith diameter (mm) | | 40 |
| Monolith cell hydraulic diameter (mm) | | 2.1 |
| Annulus width (mm) | — | 2.15 |
| Thickness of catalyst coat | | |
| Outer side of wrapping (μm) | — | 200 |
| Monolith coat (μm) | — | 200 |

The high linear velocity in the annulus of the tubular reformer of the invention provides efficient heat transfer from the reformer wall to the process gas. The smaller diameter of the tube enables a high heat flux without creating an excessive temperature gradient over the reformer tube, thus the increased heat transfer can be fully utilised. The coat of catalyst on the monolith wrapping, i.e. on the inner wall of the annulus channel, lowers the temperature of the gas due to the reforming reaction which provides a larger temperature difference between the inner wall of the reforming tube and the gas and therefore increases the heat flux in the reactor. The monolith in the centre provides a larger catalyst volume operating at lower linear velocity where the gas can react and leave the monolith close to equilibrium. The space taken up by the flow deflector in each segment is 10 cm out of 50 cm. Details on reactor performance are given in Table 3.

TABLE 3

Reactor performance

| Performance | Conventional tubular reformer | Tubular reformer of invention | Δ |
|---|---|---|---|
| Pressure drop (kg/cm$^2$ g) | 2.8 | 2.4 | |
| No. of tubes | 264 | 470 | |
| Volume tube metal (capacity, m$^3$) | 19.75 | 6.2 | factor 3 |
| Average heat flux, inner side of tubes (kcal/m$^2$) | 86000 | 134000 | 60% |
| Mass flux, average (kg/m$^2$/h) | 62500 | 253000 | factor 4 |
| Average inner wall heat transfer coefficient (kcal/m$^2$/° C.) | 1200 | 2000 | |
| Production per volume reactor (H2 + CO) Nm$^3$/l | 2.3 | 8.8 | factor 4 |
| Production (H2 + CO) per outer area reactor Nm$^3$/m$^2$ | 89 | 129 | 45% |

TABLE 3-continued

Reactor performance

| Performance | Conventional tubular reformer | Tubular reformer of invention | Δ |
|---|---|---|---|
| Maximum temperature difference over reforming tube (° C.) | 59 | 56 | |

As seen in Table 3, the tubular reformer of the invention results in that the average heat flux is 60% higher, the mass flux is four times higher, production per volume of reactor increases four times, production per external tube area increases by 45% and the tube material volume is reduced to a third. These improvements are accomplished at lower pressure drop and lower temperature difference over the tube wall.

The invention claimed is:

1. A duct having a flow deflector arranged therein, the flow deflector comprising a first member and second member, in which either of said first and second member has a geometry selected from concave, convex, planar, planoconcave, planoconvex and combinations thereof, and in which said first and second members intersect and form an angle α of 30° to 150° with respect to each other, the first member is provided with an aperture that defines an inner perimeter on said first member, said inner perimeter of the first member corresponds to the perimeter of the second member, and said second member intersects said first member through the aperture and at intersection points on the first member located along a line joining two directly opposing points of the inner perimeter of the first member, and wherein the duct is formed by inner and outer ducts in which the space inside the inner duct defines an inner region for the passage of a fluid and the space between the inner and outer ducts defines an annular region for the passage of the fluid, the first member intersects said annular region and extends across said annular region at an angle α/2 with respect to the length axis of the duct until contacting the outer duct along the perimeter of the first member, the second member intersects said inner region and extends across said inner region until contacting the inner duct along the perimeter of said second member.

2. A duct according to claim 1, wherein the first and second members of the flow deflector are planar with the first planar member extending along a first plane and the second planar member extending along a second plane.

3. A duct according to claim 2, wherein the aperture of the first planar member of the flow deflector is concentric with the rest of the first planar member.

4. A duct according to claim 1, wherein the duct is a square duct, rectangular duct, circular duct or tube.

5. Tube according to claim 4, in which the inner duct is in the form of an inner tube and the outer duct is in the form of an outer tube, the inner tube further comprises a catalyst selected from particles forming a catalyst fixed bed, catalyst coated or impregnated on structural elements arranged within the inner tube and combinations thereof.

6. Tube according to claim 5, wherein the structural element is in the form of a monolith.

7. Tube according to claim 6, wherein catalyst is coated or impregnated on the outside of the monolith wrapping in contact with the inner tube.

8. Tube according to claim 5, wherein the annular region of the tube is provided with static mixing elements selected from the group consisting of corrugated surface fitted along the outer wall of the inner tube, corrugated surface fitted along the inner wall of outer tube, spiral element extending along the width and length of the tube and combinations thereof.

9. Reactor tube comprising a number of tubes according to claim 5 stacked on top of each other.

10. Reactor comprising one or more reactor tubes according to claim 5, in which the reactor is an endothermic catalytic reactor.

11. Process for reforming a hydrocarbon feed in a reactor according to claim 10, the method comprising:
(a) passing said hydrocarbon feed to at least one reactor tube,
(b) dividing said hydrocarbon feed into a sub-stream passing through the annular region and a sub-stream passing through the inner tube of the reactor tube,
(c) subjecting the sub-stream passing through the inner tube to reforming by passage through the catalyst fixed bed and/or the one or more structural elements arranged within the inner tube,
(d) deflecting the sub-stream leaving the catalyst fixed bed and/or the one or more structural elements towards the annular region and simultaneously deflecting the sub-stream passing through the annular region towards the inner tube,
(e) conducting steps (c) and (d) at least once,
(f) withdrawing from the reactor a reformed hydrocarbon stream.

* * * * *